(12) United States Patent
Thawani et al.

(10) Patent No.: US 11,446,980 B2
(45) Date of Patent: Sep. 20, 2022

(54) HVAC SYSTEM NOISE CONTROL

(71) Applicant: DENSO International America, Inc., Southfield, MI (US)

(72) Inventors: Prakash Thawani, West Bloomfield, MI (US); Stephen Sinadinos, Commerce Township, MI (US); Joseph Burtch, Novi, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 0 days.

(21) Appl. No.: 17/192,977

(22) Filed: Mar. 5, 2021

(65) Prior Publication Data

US 2021/0387503 A1 Dec. 16, 2021

Related U.S. Application Data

(60) Provisional application No. 63/037,104, filed on Jun. 10, 2020.

(51) Int. Cl.
*B60H 1/00* (2006.01)
*F24F 13/24* (2006.01)

(52) U.S. Cl.
CPC ... *B60H 1/00557* (2013.01); *B60H 2001/006* (2013.01); *F24F 13/24* (2013.01); *F24F 2013/242* (2013.01)

(58) Field of Classification Search
CPC .............. F24F 13/24; F24F 2013/242; B60H 1/00557; B60H 2001/006
See application file for complete search history.

(56) References Cited

U.S. PATENT DOCUMENTS

| | | | | |
|---|---|---|---|---|
| 3,033,307 A | * | 5/1962 | Sanders | F01N 1/10 181/224 |
| 3,511,336 A | * | 5/1970 | Rink | F04D 29/664 181/224 |
| 6,617,002 B2 | | 9/2003 | Wood | |
| 7,731,878 B2 | | 6/2010 | Wood | |
| 8,474,574 B1 | * | 7/2013 | Kobayashi | G10K 11/172 181/292 |
| 9,390,702 B2 | | 7/2016 | Mathur | |
| 9,759,447 B1 | | 9/2017 | Mathur | |
| 2011/0232701 A1 | * | 9/2011 | Colon | A47L 15/4246 134/198 |
| 2012/0240486 A1 | * | 9/2012 | Borroni | B32B 5/142 52/145 |
| 2014/0299404 A1 | * | 10/2014 | Lind | G10K 11/161 181/212 |
| 2019/0003737 A1 | * | 1/2019 | Hickey | F24F 13/20 |

FOREIGN PATENT DOCUMENTS

WO 2019005858 A1 1/2019

* cited by examiner

*Primary Examiner* — Lionel Nouketcha
(74) *Attorney, Agent, or Firm* — Dickinson Wright PLLC

(57) ABSTRACT

A sound damper and associated system are disclosed for damping sound. In embodiments, the sound damper is utilized within an automotive HVAC system. A passage wall defines an air passageway that transmits air. The sound damper includes a micro perforated panel (MPP) located within an opening formed into a passage wall. A back wall is spaced from the MPP, and a cavity is provided between the back wall and the MPP that is outside the air passageway. In embodiments, the MPP can be covered by a non-perforated film that is acoustically transparent and air impermeable.

20 Claims, 5 Drawing Sheets

HVAC SYSTEM NOISE CONTROL

CROSS-REFERENCE TO RELATED APPLICATION

This application claims the benefit and priority of U.S. Provisional Application No. 63/037,104, filed on Jun. 10, 2020, the disclosure of which is incorporated in its entirety by reference herein.

TECHNICAL FIELD

The present disclosure relates to noise control within heating, ventilating, and air-conditioning (HVAC) systems.

BACKGROUND

HVAC systems work to generally to control thermal characteristics of air. In an automobile, an automotive HVAC system works to either heat or cool the air within the cabin of the vehicle for comfort. A blower fan or airflow generator may be relied on to circulate the air through the HVAC system, which can create noise. During operation of the HVAC system, the air temperature and pressure drop may change which may also cause noise. The noise generated by the operation of the HVAC system at higher blower speeds may be more cumbersome with tighter packaging space. Moreover, the noise may be more noticeable in electric vehicles where no noise is present unlike from an internal combustion engine to mask the HVAC noise.

SUMMARY

In an embodiment, an automotive HVAC system includes an HVAC module having a passage wall providing a passageway configured to facilitate pressurized air flow therein, the passage wall having an opening therethrough, wherein the passage wall and a back wall (e.g., dash wall) spaced from the passage wall define a cavity therebetween, the cavity being located outside the passageway; a micro perforated panel (MPP) covering the opening and separating the passageway from the cavity, the MPP having a first side facing the passageway and a second side facing the cavity; and a non-perforated film covering the first side of the MPP.

In an embodiment, a sound damper for an HVAC system includes a micro perforated panel (MPP) configured to attach to a passage wall that defines a passageway that is configured to facilitate pressurized air flow therein, the MPP and a back wall (e.g., dash wall) collectively defining a cavity located outside the passageway; and a non-perforated film covering the MPP.

In an embodiment, a system for damping or suppressing noise within an automotive HVAC includes an HVAC module having a passage wall at least partially defining an air passageway configured to transmit pressurized air therethrough, wherein the passage wall includes an opening therethrough; a micro perforated panel (MPP) attached to the passage wall at the opening; and a back wall (e.g., dash wall) spaced from the MPP and at least partially defining a cavity between the back wall and the MPP, wherein the cavity is located outside of the air passageway.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
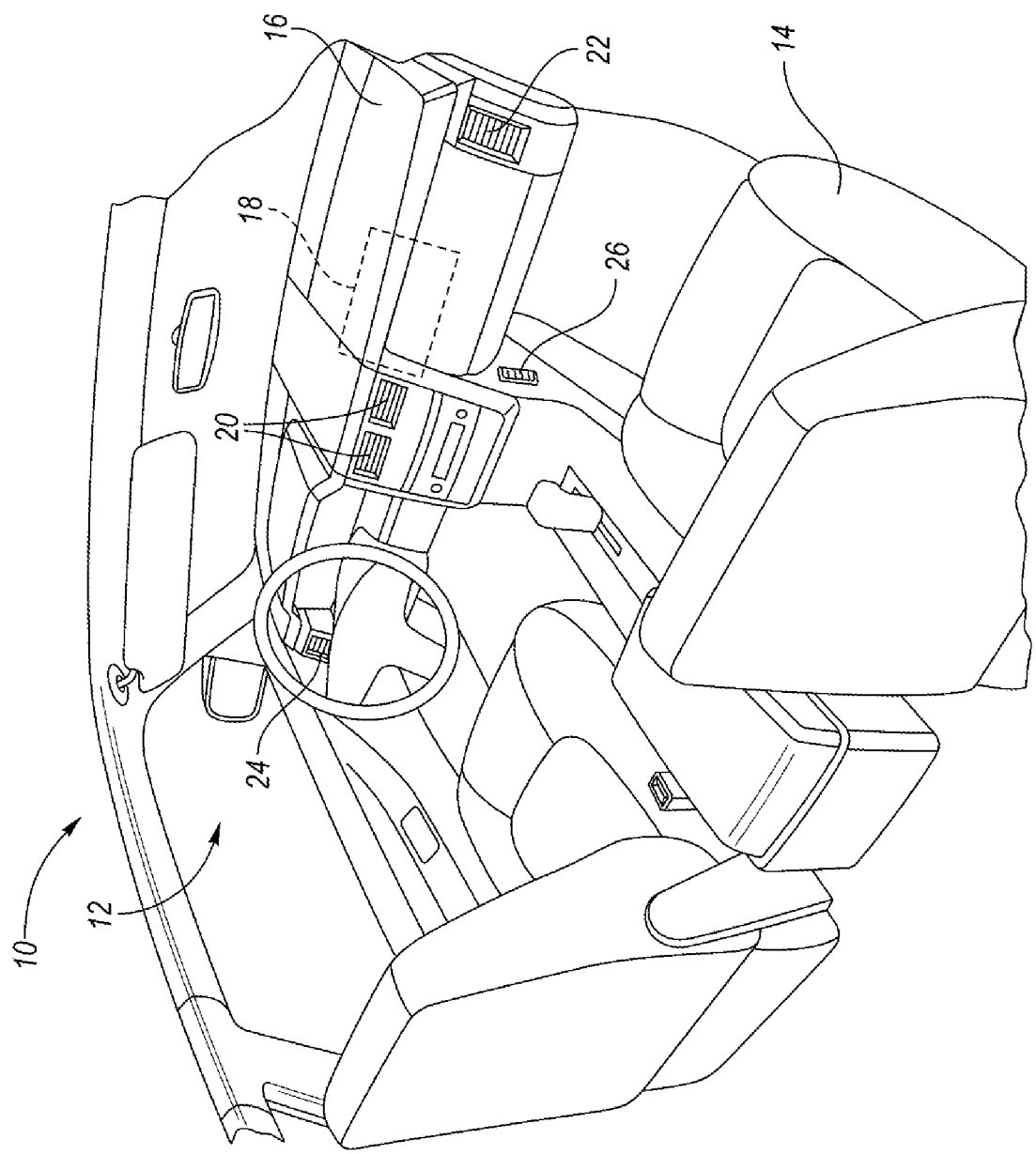
FIG. 1 is a perspective view of an interior cabin of an automotive vehicle having an HVAC system, according to an embodiment.

Directional terms may be used herein, such as "front," "rear," "forward," and "backward." Unless otherwise noted, these terms are relative to the view shown in FIG. 1. For example, "forward" or "front" refer to the direction toward the front of the vehicle (e.g., to the right in FIG. 1), and "rear" or "backward" refer to the direction toward the back of the vehicle (e.g., to the left in FIG. 1).

FIG. 1 shows an automotive vehicle 10 having a HVAC system that will be described further in detail herein. The vehicle 10 includes a passenger space or cabin 12 having one or more seats 14. While only one row of seats 14 is illustrated, it should be understood that a second row, third row, and more rows of seats can be provided, and the HVAC system can be configured to treat air for all of these rows of seats. The cabin 12 may include a dashboard 16 that may have a series of outlets that are fluidly connected to an HVAC module 18. The outlets may include, for example, a center face vent outlet 20, a passenger face vent outlet 22, a demister vent outlet 24, and a foot vent outlet 26. One or more of these vents may be present, and it should be understood that additional or fewer number of vents can be present than what is illustrated. The HVAC module 18 provides the desired flow of conditioned air to these vents. The HVAC module 18 may be located directly in front of dashboard 16 such that it may be hidden from view by any passengers within the cabin 12.

Figure 2:
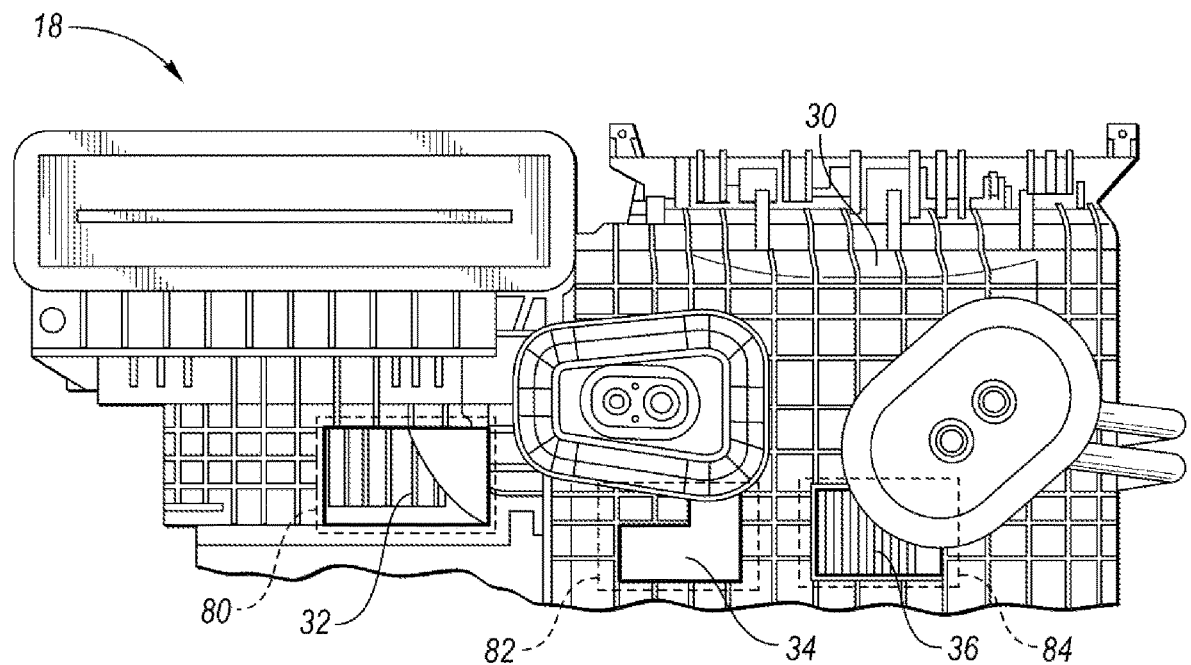
FIG. 2 is a rear elevational view of an HVAC module of the HVAC system, according to an embodiment.

FIG. 2 shows a rear view of the HVAC module 18. The view shown here is merely an example of one embodiment of an HVAC module. The side of the HVAC module 18 shown in this illustration is the side facing the dashboard 16. The HVAC module 18 includes an outer casing or housing 30 that contains the components that work to condition the air, and which also at least partially define air flow chambers or passages where the air flows therein. For example, within the housing 30 is a blower fan 32, also referred to as an airflow generator. The blower fan 32 is operated to move, thereby moving and circulating air through the HVAC module 18. Air is drawn by the blower fan 32 from the outside, or from a recirculating air inlet. The blower fan 32 blows the drawn air throughout through a blower outlet 34, where the air then flows from the blower outlet 34 to an evaporator case (not shown). The air can then be distributed to the various vents via fluid passages, channels, and the like by flowing through a plenum chamber 36. Each of the blower fan 32, blower outlet 34, and plenum chamber 36 is visible in the view of FIG. 2 due to a corresponding opening in the housing 30 of the HVAC module 18.

Other components within the HVAC module 18 may be included, but are not illustrated here. For example, the HVAC module 18 may include one or more heat exchangers (e.g., evaporator, heater core) for cooling or heating the air, and one or more air mix doors to control the amount of air that flows through the heat exchangers.

Within an HVAC system such as the one disclosed herein, the blower fan may produce the most noise among the working components. The noise may especially propagate when the blower is running at higher speed. Moreover, during operation of the HVAC system, aerodynamically-induces noise, internal resonances, and the like also contribute to the total noise of the overall HVAC system. The noise can be even a greater issue in an electric car, in which no combustion engine is present to muffle or mask the HVAC system-induced noise.

According to various embodiments of the present disclosure, a sound damper (e.g., configured to perform noise suppression or noise reduction) is provided to reduce noise present in the HVAC system. The sound damper includes a micro perforated panel or plate (MPP) that can be placed in various placed within the HVAC system, particularly along walls of passageways that facilitate the transport of air flow from one region of the HVAC module 18 to another region of the HVAC module 18. A cavity can also be located on the opposite side of the MPP, separated from the passageway in which the MPP resides. And, as will be described in embodiments below, an air seal may be provided over the MPP to prevent the air in the passageway from entering the cavity. The air seal may be a thin layer or film of biaxially-oriented polyethylene terephthalate (boPET, or MYLAR) may be provided over the MPP to prevent air from the passageway from entering the cavity. The presence of the MPPs in the HVAC system can reduce the overall noise. The reduction in noise can be further aided by providing the cavity and the boPET in the HVAC system.

Figure 3:
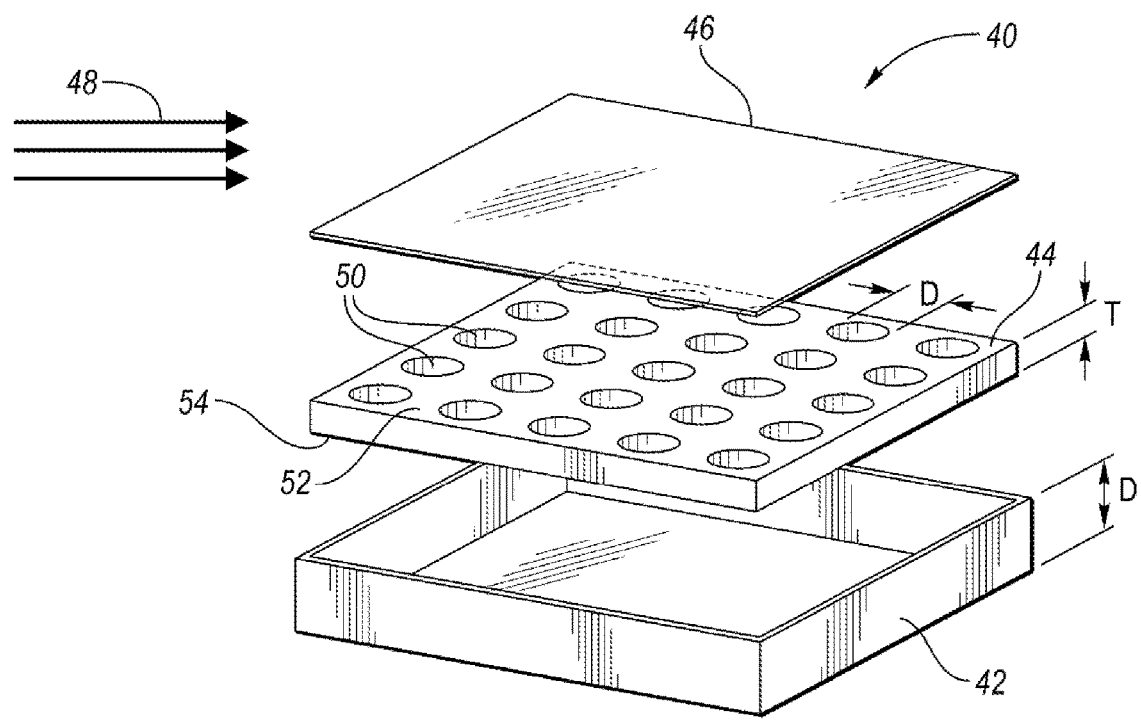
FIG. 3 is an exploded perspective view of a sound damper for implementation into the HVAC system, according to an embodiment.

FIG. 3 illustrates an exploded perspective schematic view of an exemplary sound damper 40, also referred to as a silencer, muffler, or noise suppressor. The sound damper 40 includes the following main components: a cavity 42, an MPP 44, and an air seal 46. In the orientation shown in FIG. 3, the air within the HVAC system flows above the air seal 46, and across the air seal 46 in a transverse direction. Arrows 48 illustrate the direction and location of air flow within a passageway of the HVAC module.

The MPP 44 may be fixed within an opening in the walls of the passageway (not shown). In other words, the MPP 44 may be an insert that blends in with the walls of the air passages within the HVAC module. This will be described additionally with reference to FIGS. 4-5 below. Returning to FIG. 3, the MPP 44 is configured to absorb sound. The MPP 44 may be an elongated sheet made of plastic, paper, metal, or other materials. Sub-millimeter size perforations 50 may be provided in the MPP 44. The perforations 50 may be holes punched or drilled into the panel using a microperforation process or otherwise made to remove material from the MPP 44.

In one embodiment, the MPP 44 has a thickness T of less than 3 millimeters (mm), and in some embodiments, the MPP is between 0.5 and 2 mm. The perforations 50 have a diameter D of less than 1 mm; in embodiments, the perforations have a diameter D between 0.05 mm and 0.5 mm, and the distance between each perforation is between 10 mm and 20 mm. As air passes across the MPP 44, friction between the moving air and the surface of the MPP (with its perforations 50) dissipates acoustic energy, converting sound into heat. This results in less noise produced by the air moving through the passageway in the HVAC module 18. Moreover, the small size of the perforations 50 provides micro-mufflers that are effective and tunable compared to conventional perforated muffling elements. The MPP 44 can be used to suppress lower frequencies and result in broadband noise reduction, which is not possible with conventional sound mufflers unless longer lengths and larger volume resonators are packaged, which is undesirable and not cost-effective. Conventional mufflers or silencers lose their effectiveness in the presence of airflow, whereas the sound damper 40 disclosed herein is relatively unaffected by the air flow, even if the flow is not grazing the micro-perforated surface of the MPP 44. Additional details of the sound damper 40 that make the above benefits possible will now be described.

As stated earlier, the sound damper 40 includes a cavity 42. The cavity 42 may be an enclosed pocket or chamber with a hollow interior. The cavity 42 may be formed in the housing 30 of the HVAC module 18. Alternatively, the cavity 42 may be a space existing between the housing 30 and another surface external to the HVAC module 18, such as the dashboard 16. As illustrated in the embodiment of FIG. 3 and further explained in subsequent Figures, the cavity 42 is located on an opposite side of the MPP 44 relative to the air flow 48 within the passages of the HVAC module 18. For example, the MPP 44 may have an upper surface or first surface 52 and an opposing lower surface or second surface 54. The first surface 52 may face the interior of the passages of the HVAC module 18 where air flows, while the second surface 54 faces away from the interior of the passages of the HVAC module 18 where air flows. The second surface 54 faces the cavity 42, and covers the cavity 42.

The cavity 42 provides a hollow interior space for sound to enter and be absorbed. While not illustrated, the interior surfaces of the cavity 42 may be equipped with sound-damping structures, such as MPP, foam, or other material. The depth D of the cavity 42 is a key parameter for increasing the noise reduction and tuning it to the desired frequency. The depth D of the cavity 42 can be the space between the MPP 44 and a wall on an opposite side of the cavity 42, such as the back side of the dashboard 16 (referred to as a dash wall) or another wall. In any embodiment, this wall that is spaced from the MPP 44 and defines the depth of the cavity can be referred to as a dash wall or back wall. Modifying cavity depth along with other parameters like porosity of the MPP 44 and size/type of perforations 50 help ascertain the frequency band where maximum noise reduction is desired. In some embodiments, there exists ample space between the HVAC module 18 and the panel of the dashboard 16, and thus this volume can be used as the cavity 42.

As stated earlier, the sound damper 40 includes an air seal 46. In embodiments, the air seal 46 is a solid, non-perforated sheet or film such as boPET (e.g., MYLAR). In another embodiment, the air seal 46 is a nylon or fabric liner. The air seal 46 prevents the air flow 48 within the passages of the HVAC module 18 from entering the cavity 42, while allowing sound to transmit into the MPP 44 and cavity 42 for absorption and muffling. In other words, the air seal 46 is acoustically transparent but air impermeable. This allows the sound damper to provide sound damping without disrupting the flow or pressure of the air flow.

Figure 4:
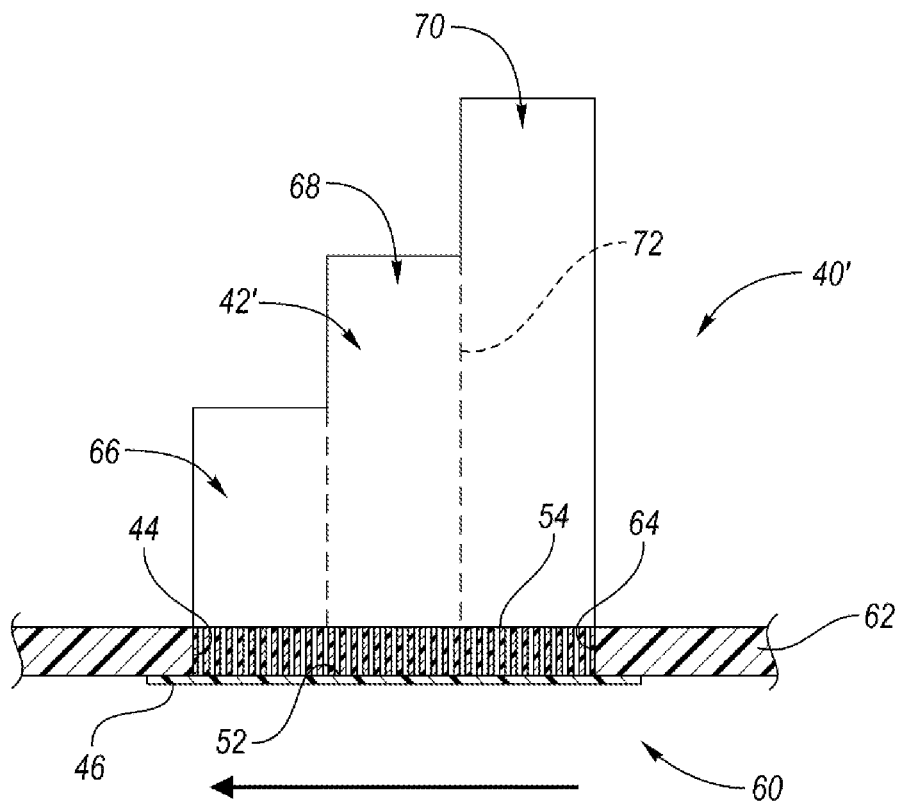
FIG. 4 is a cross-sectional schematic view of the sound damper according to one embodiment.

FIG. 4 illustrates an embodiment of the sound damper 40' attached to a wall of the fluid passageway in the HVAC module 18. The HVAC module 18 includes a fluid passage or passageway 60 configured to transport blown air from one point to another within the HVAC module 18. The fluid passage 60 is bound or defined by a wall 62 of the HVAC module 18. The MPP 44 is mounted or otherwise fixed within a corresponding opening 64 in the wall 62. While FIG. 4 illustrates the MPP 44 as being fully located within the opening 64 of the wall 62, in other embodiments the MPP 44 is outside of the opening 64 but covers the opening 64. The MPP 44 can be located at least partially within the opening 64. The air seal 46 is placed along the first surface 52 of the MPP 44 so as to cover the micro perforations of the MPP 44.

The cavity 42' is shown in this embodiment to have multiple individual chambers, for example a first chamber 66, a second chamber 68, and a third chamber 70. Each chamber 66-70 can be uniquely shaped relative to the other chambers. For example, in this embodiment, the first chamber 66 has a first depth that is less than a second depth of the second chamber 68, which is, in turn, less than the depth of the third chamber 70. The chambers 66-70 may be separated from one another by partitions 72. These partitions 72 may be integrally formed with the boundary walls of the cavity 42'. The partitions 72 can fluidly separate the individual chambers 66-70 so that noise can at least somewhat stay contained within each chamber. The partitions 72 can be made of MPP material as well.

Figure 5:
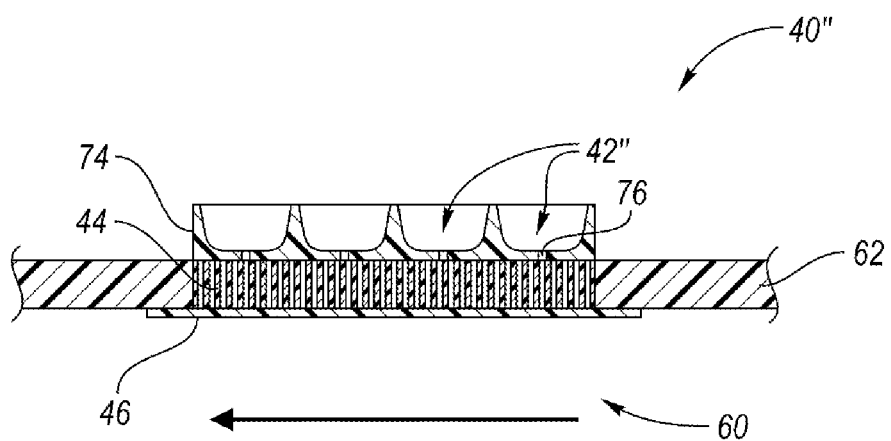
FIG. 5 is a cross-sectional schematic view of the sound damper according to another embodiment.

FIG. 5 shows an embodiment of the sound damper 40" attached to a wall of the fluid passageway in the HVAC module 18 according to another embodiment. The sound damper 40" has a plurality of cavities 42". Each cavity 42" can be formed within a wall 74 of, for example, the HVAC module 18. A portion of the wall 74 adjacent the MPP 44 may include inlets 76. Each inlet 76 connects one of the hollow cavities 42" with the MPP 44 such that sound transmitting through the MPP 44 can be received within the cavities 42" via the inlets 76.

In the illustrated embodiment of FIG. 5, each cavity 42" is an inverted-cup shape, with the narrow portion of the cup-shape closer to the inlets 76. Other shapes of cavities are contemplated. For example, in other embodiments each cavity is cone shaped, tubular, pyramid, rectangular, etc. The cavity can even be an irregular-shaped available volume. The shape of the cavities can be modified through trial and calibration to dampen a desired frequency.

Figure 7:
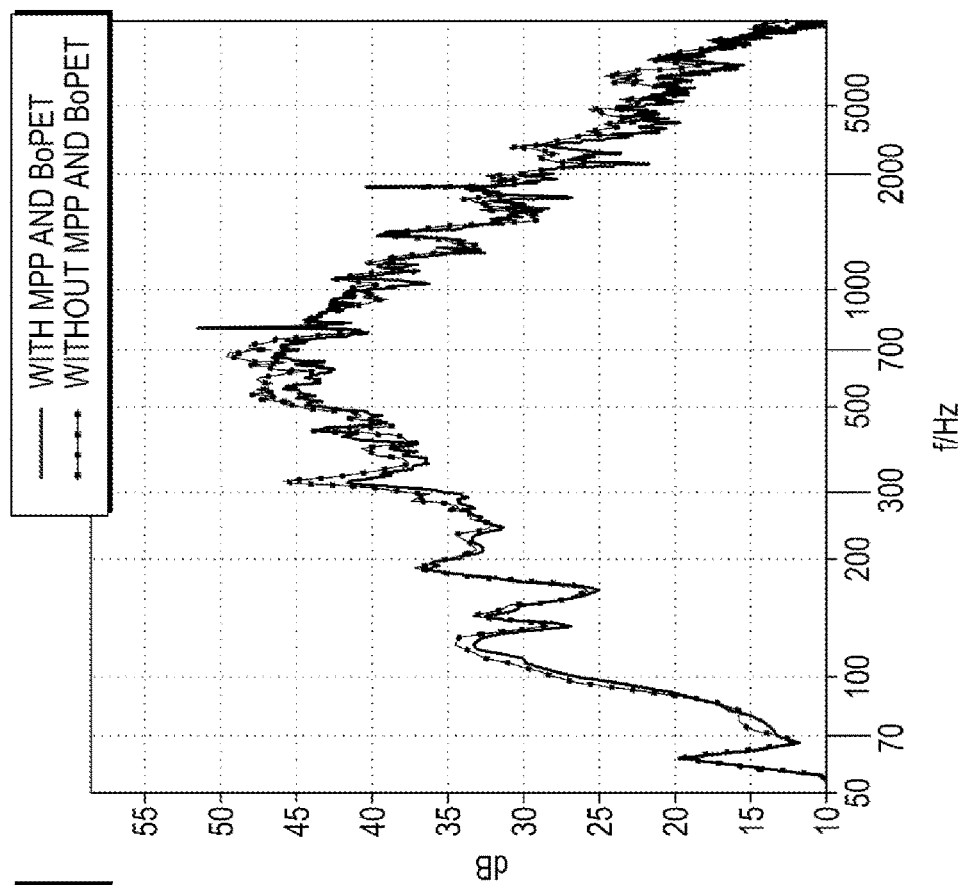
FIG. 7 is another graph comparing sound magnitudes with various sound frequencies, for both a system with a sound damper and a system without a sound damper, according to an embodiment.
Figure 6:
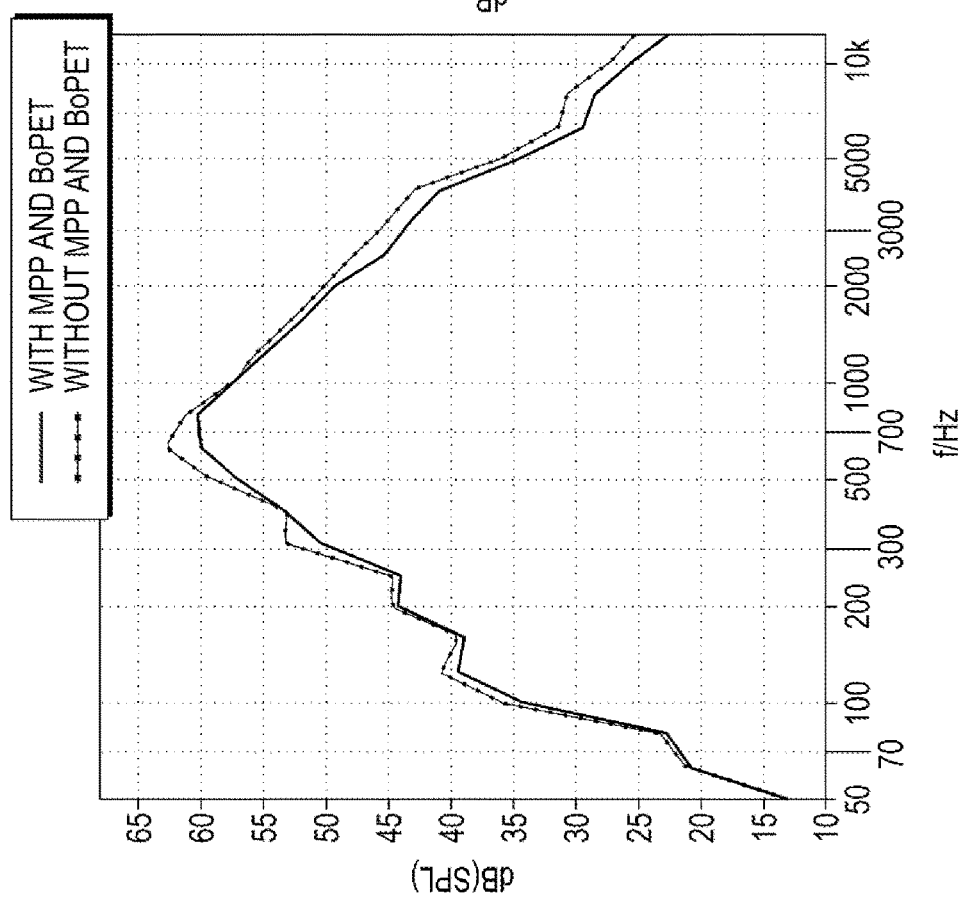
FIG. 6 is a graph comparing sound magnitudes with various sound frequencies, for both a system with a sound damper and a system without a sound damper, according to an embodiment.

FIGS. 6-7 show some results of the effects of utilizing a sound damper 40 (or 40' or 40", etc.) as described herein. The x-axis of each plot is frequency (e.g., Hertz, Hz), and the y-axis is sound levels in decibels (dBA) at the Driver's ear, with the plot of FIG. 6 shown on a third octaves scale and the plot of FIG. 7 showing the narrowband data. Referring to FIG. 6, the plot comparing sound levels without a sound damper 40 (e.g., MPP and boPET seal) provides a baseline. Both the plots reference or relate to the same set of data for high blower operating conditions, showing an overall noise reduction of 1.5 dB and across the whole frequency rane, between with and w For example, a baseline frequency of 300 Hz yields a 54 dB output in sound without the sound damper 40, and the sound level is reduced to 49 Hz at the same frequency with the sound damper 40 included. FIG. 7 shows a similar comparison with less filtering of the sound values on the plot.

Figure 8:
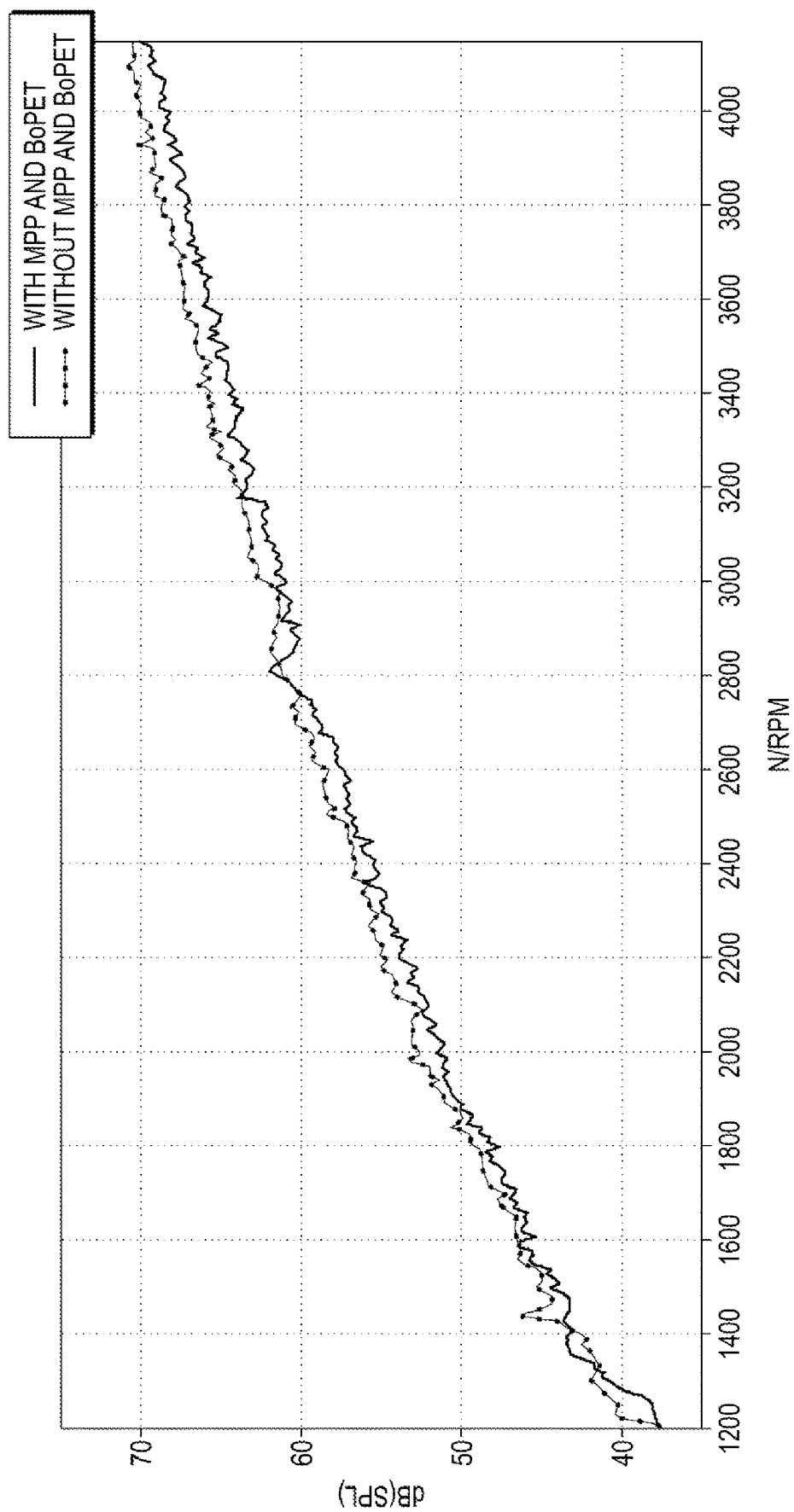
FIG. 8 is a graph comparing sound magnitudes with HVAC blower speeds of the system both with and without a sound damper, according to an embodiment.

FIG. 8 compares the sound levels with and without MPP, perceived at the driver's ear for HVAC blower speed sweep from low to high blower speeds. The x-axis is the speed of the blower fan 32 in revolutions per minute (RPM), and the y-axis is the sound levels (dBA) perceived at the driver's ear, showing a noise reduction across the whole blower RPM range.

The sound damper 40 illustrated in FIGS. 3-5 are merely exemplary in structure. And, these sound dampers can be placed in a variety of locations throughout the HVAC module 18. For example, referring to FIG. 2, the sound dampers 40 described herein can be located at location 80 in a location that covers the blower fan 32. In this embodiment, an opening can be provided in the housing 30 of the HVAC module 18 (shown in FIG. 2, revealing the blower fan 32 in view), and the sound damper 40 can be located here with the MPP 44 located in this opening, and the cavity 42 can be between the shown surface of the HVAC module 18 and the dashboard 16. In another embodiment, the sound damper 40 can be located at location 82 in a location of the blower outlet 34, with the MPP 44 located adjacent the blower outlet 34 and the cavity can again be between the HVAC module 18 and the dashboard 16. In yet another embodiment, the sound damper 40 can be located at location 84 in a location that covers the plenum chamber 36; an opening can be provided in the housing 30 (shown in FIG. 2, revealing the plenum camber 36 in view), and the MPP 44 can be located at this opening with the cavity between the HVAC module 18 and the dashboard 16.

It should be understood that the techniques and structure disclosed herein for reducing noise should not be limited to only HVAC systems. The combination of the disclosed cavity, MPP, and film can be used in other settings such as, for example, a vehicle exhaust, engine intake systems, household HVAC systems, vacuum cleaners, yard equipment, aerospace just to name a few. In these settings, any cavity or available volume along the path of air flow can be utilized, with the MPP separating the main air flow passage from the cavity, and the film (e.g., BoPET) covering the MPP and located between the MPP and the main air flow passage.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. An automotive HVAC system, comprising:
   an HVAC module having a passage wall providing a passageway configured to facilitate pressurized air flow therein, the passage wall having an opening therethrough, wherein the passage wall and a back wall spaced from the passage wall define a hollow cavity therebetween, the cavity being located outside the passageway;
   a micro perforated panel (MPP) covering the opening and separating the passageway from the cavity, the MPP having a first side facing the passageway and a second side facing the cavity; and
   a non-perforated film covering the first side of the MPP.

2. The automotive HVAC system of claim 1, wherein the non-perforated film is acoustically transparent and air impermeable such that it prevents air from passing through the opening.

3. The automotive HVAC system of claim 2, wherein the non-perforated film is biaxially-oriented polyethylene terephthalate (boPET).

4. The automotive HVAC system of claim 1, wherein the MPP is fixed within the opening of the passage wall.

5. The automotive HVAC system of claim 1, wherein the back wall is a surface of the HVAC module.

6. The automotive HVAC system of claim 1, wherein the back wall is a surface of a dashboard panel.

7. The automotive HVAC system of claim 1, wherein the cavity includes a plurality of chambers therein, each chamber separated from an adjacent chamber by a respective partition.

8. The automotive HVAC system of claim 7, wherein the chambers are sized differently compared to one another.

9. A sound damper for an HVAC system, the sound damper comprising:
   a micro perforated panel (MPP) configured to attach to a passage wall that defines a passageway that is configured to facilitate pressurized air flow therein, the MPP and a back wall collectively defining a hollow cavity located outside the passageway; and
   a non-perforated film covering the MPP.

10. The sound damper of claim 9, wherein the MPP has a first surface configured to face the passageway and second surface configured to face the cavity, wherein the non-perforated film covers the first surface.

11. The sound damper of claim 9, wherein the non-perforated film is acoustically transparent and air impermeable such that it prevents air from passing through the opening.

12. The sound damper of claim 11, wherein the non-perforated film is biaxially-oriented polyethylene terephthalate (boPET).

13. The sound damper of claim 9, wherein the cavity includes a plurality of chambers therein, each chamber sized differently compared to one another.

14. The sound damper of claim 13, wherein each chamber is separated from an adjacent one of the chambers by a corresponding partition.

15. A system for damping noise within an automotive HVAC, the system comprising:
   an HVAC module having a passage wall at least partially defining an air passageway configured to transmit pressurized air therethrough, wherein the passage wall includes an opening therethrough;
   a micro perforated panel (MPP) attached to the passage wall at the opening; and
   a back wall spaced from the MPP and at least partially defining a hollow cavity between the back wall and the MPP, wherein the cavity is located outside of the air passageway.

16. The system of claim 15, further comprising a non-perforated film covering the MPP.

17. The system of claim 16, wherein the MPP includes a first surface facing the air passageway and an opposing second surface facing away from the air passageway, and wherein the non-perforated film covers the first surface.

18. The system of claim 16, wherein the non-perforated film is acoustically transparent and air impermeable such that it prevents air from passing through the opening.

19. The system of claim 18, wherein the non-perforated film is biaxially-oriented polyethylene terephthalate (boPET).

20. The system of claim 15, wherein the cavity includes a plurality of separated chambers therein.

* * * * *